(12) United States Patent
Sitton

(10) Patent No.: US 6,522,974 B2
(45) Date of Patent: Feb. 18, 2003

(54) METHOD FOR VIBRATOR SWEEP ANALYSIS AND SYNTHESIS

(75) Inventor: Gary Arthur Sitton, Houston, TX (US)

(73) Assignee: Westerngeco, L.L.C., Houston, TX (US)

(*) Notice: Subject to any disclaimer, the term of this patent is extended or adjusted under 35 U.S.C. 154(b) by 13 days.

(21) Appl. No.: 09/790,150

(22) Filed: Feb. 21, 2001

(65) Prior Publication Data

US 2002/0010545 A1 Jan. 24, 2002

Related U.S. Application Data

(60) Provisional application No. 60/185,981, filed on Mar. 1, 2000.

(51) Int. Cl.[7] .................................................. G01V 1/28
(52) U.S. Cl. ........................................... 702/17; 702/1
(58) Field of Search ....................................... 702/1, 17

(56) References Cited

U.S. PATENT DOCUMENTS

| 3,786,409 A | * | 1/1974 | Sorkin | 367/137 |
|---|---|---|---|---|
| 4,339,810 A | | 7/1982 | Nichols et al. | 367/49 |
| 4,782,446 A | | 11/1988 | Ehler et al. | 367/421 |
| 4,926,392 A | | 5/1990 | Handley et al. | 367/59 |
| 6,035,257 A | * | 3/2000 | Epperson | 702/17 |
| 6,161,076 A | * | 12/2000 | Barr et al. | 367/117 |

* cited by examiner

Primary Examiner—Edward Lefkowitz
Assistant Examiner—Anthony Gutierrez
(74) Attorney, Agent, or Firm—David S. Figatner; Madan, Mossman & Sriram, P.C.

(57) ABSTRACT

A process for analyzing, decomposing, synthesizing and extracting seismic signal components, such as the fundamental of a pilot sweep or its harmonics, from seismic data uses a set of basis functions. The basis functions may be any of the harmonics or other components derived from the pilot sweep. These basis functions are modulated with the data being analyzed. The resulting data output from the modulation are then low-pass filtered so that the instantaneous amplitude and differential phase of the particular signal component to be synthesized may be computed. Each targeted component is then synthesized and the result subtracted from the remaining data.

23 Claims, 5 Drawing Sheets

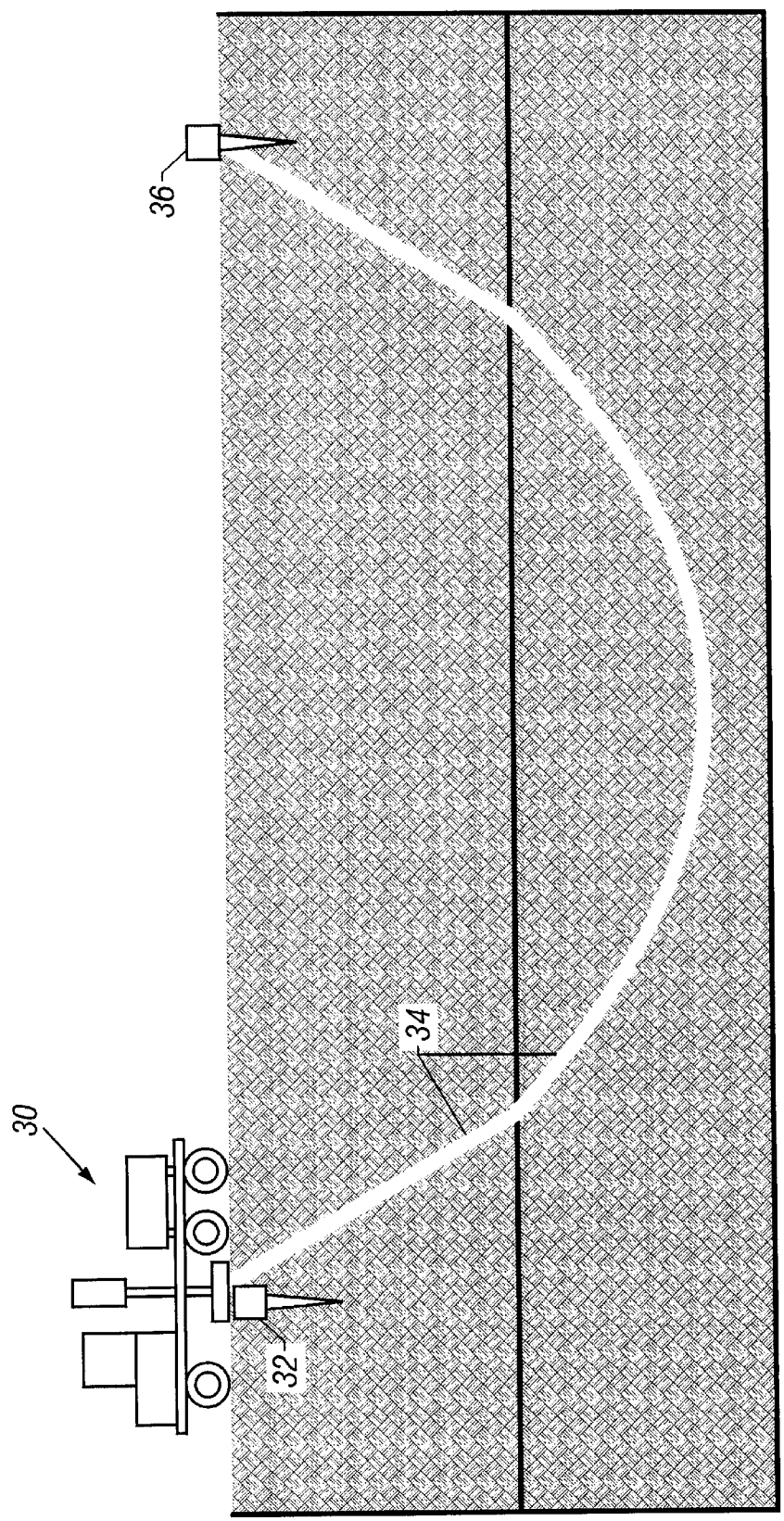

METHOD FOR VIBRATOR SWEEP ANALYSIS AND SYNTHESIS

CROSS-REFERENCES TO RELATED APPLICATIONS

This application claims priority from U.S. Provisional Application Ser. No. 60/185,981 filed on Mar. 1, 2000.

BACKGROUND OF THE INVENTION

1. Field of the Invention

The present invention relates generally to signal analysis and seismic data processing for geophysical surveys and particularly a method of separating and synthesizing seismic signals into harmonic and other components.

2. Description of the Related Art

The seismic exploration industry uses acoustic impulses to impart sonic vibrations into the earth to delineate subsurface structure for mineral exploration and development. These acoustic impulses may be from an explosive, implosive or swept-frequency (or chirp) source. A recording of the acoustic reflection and refraction wavefronts that travel from the source to a receiver is used to produce a seismic field record. Variations in the travel times of reflection and refraction events in these field records indicate the position of reflection surfaces within the earth. The analysis and correlation of events in one or more field records in seismic data processing produces an acoustic image that demonstrates subsurface structure. The acoustic images are used to find valuable mineral deposits.

The swept-frequency or chirp type seismic source may utilize a relatively long pilot signal such as 2 to 15 seconds to assure sufficient energy is imparted to the earth. The swept-frequency or chirp type source method relies on signal compression to compress the signal and ensure sufficient vertical resolution to resolve the position of subsurface reflectors. Signal compression generally is called deconvolution, with many techniques well known in the art of seismic data processing. Deconvolution of sweep or chirp signals compresses the source signal into a much shorter signal representative of a subsurface reflective boundary. The accuracy and effectiveness of any deconvolution technique is directly related to how well the source signal is known or understood. Most deconvolution operators are derived from statistical estimates of the actual source waveform.

In practice, the swept-frequency or chirp source waveform that is actually generated and imparted to the earth often does not resemble the idealized source signal the practitioner attempted to induce into the earth. Nonlinear effects in the earth and the source energy generating system, for instance a seismic vibrator, may create strong harmonics and other dynamic phenomena that introduce unpredictable distortions into the actual signal generated and imparted into the earth. These nonlinear effects are not predictable and are source site dependent. The strength and characteristics of the nonlinear distortions change from one source sweep position to the next. These nonlinear effects often interfere with the deconvolution enough to substantially degrade the acoustic images. A method that accurately decomposes the swept-frequency signal actually generated into its various components, allowing more effective deconvolution and other filtering, is highly desirable.

There will be many advantages to accurately decomposing seismic signals into their component harmonic parts. Deconvolution, a technique dependent on accurate signal analysis, will be much more accurate. Various separable harmonics or noise components of seismic signals can be enhanced, isolated or suppressed using appropriate filters. For instance, instrument noise, extrinsic noise and other noise not amenable to conventional filtering may be targeted precisely in many circumstances as a result of this decomposition method.

BRIEF SUMMARY OF THE INVENTION

The present invention is a method for decomposing and synthesizing a seismic signal into harmonic and other extrinsic components that is accurate at discrete time or sample data points. A basis set of signal component functions is formed using the instantaneous amplitude and phase of the pilot source and related signal components observed in real data, for example, a set of bases comprising harmonics of the pilot sweep. These bases are used to form complex modulation functions for each signal component or harmonic to be analyzed and synthesized by this invention. The seismic signal being investigated is used to modulate the derived complex modulation function and the output is low pass filtered. This low pass filter output is used to compute the instantaneous amplitude and differential phase of the signal component being analyzed. From these computations the particular signal components being targeted are synthesized. These synthesized signal component data are then isolated from the original target data by subtraction, leaving the resulting time series containing the remaining signal components. Each signal component is subsequently likewise synthesized, extracted and thereby isolated in turn from the remaining data. The result is an accurate decomposition and synthesis of the original seismic signal into its various signal components.

BRIEF DESCRIPTION OF THE DRAWINGS

FIG. 1a illustrates a typical seismic recording system for data acquisition.

DESCRIPTION OF THE PREFERRED EMBODIMENTS

Figure 1B:
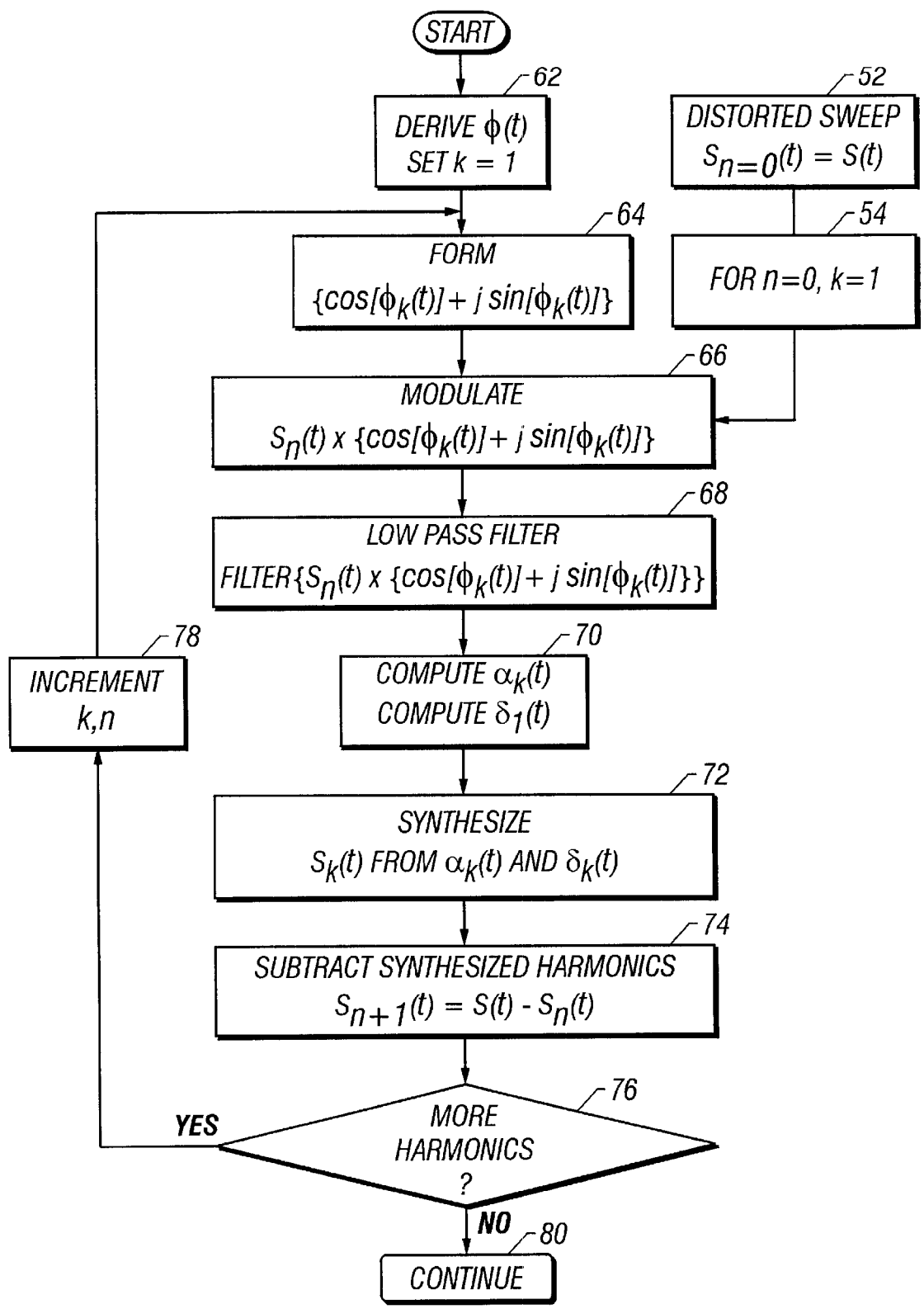
FIG. 1b illustrates a flow chart for a preferred embodiment of the invention.

The present invention describes a new process for analyzing, decomposing, synthesizing and extracting seismic signal components, such as the fundamental of a pilot sweep or its harmonics, from seismic data. This synthesis is accomplished by modulating basis functions derived from a pilot sweep by the data being analyzed. The resulting data are low-pass filtered so that the instantaneous amplitude and differential phase of the particular signal component to be synthesized may be computed. Each targeted component is then synthesized and the result is subtracted from the remaining data.

The present invention is based upon the concept that any real function R(t) may be represented as an analytic complex signal Z(t) consisting of the original function in quadrature with its Hilbert transform H[R(t)]=I(t) so that $$Z(t)=R(t)+jI(t), \quad (1)$$

where $j=\sqrt{-1}$, and R(t) and I(t) are out of phase at all frequencies by $\pi/2$ radians and are thus orthogonal. A description of the Hilbert transform may be found in Oppenheim, A., and Schafer, R., *Discrete-Time Signal Processing*, Prentice-Hall, Englewood Cliffs, N.J., 1975, chap. 10.

The instantaneous amplitude A(t), phase $\Phi(t)$, and frequency $\Theta(t)$ are discussed in Taner, M., Koehler, F., and Sheriff, R., "Complex seismic trace analysis," *Geophysics*, Vol. 44, No. 6, June 1979, pp. 1041–1063, and are defined as $$A(t)=[R^2(t)+I^2(t)]^{1/2}, \quad (2)$$

$$\Phi(t)=\tan^{-1}[I(t)/R(t)], \text{ and} \quad (3)$$

$$\Theta(t)=\Phi'(t)=d[\Phi(t)]/dt \quad (4)$$

From the above definitions it can easily be shown that $$R(t)=A(t)\cos[\Phi(t)]. \quad (5)$$

For this invention we model a narrow band (sinusoidal) signal with a 'slowly' varying amplitude and frequency. Let us define the instantaneous or average amplitude as being a constant plus some perturbation as a function of time, thus $$A(t)=\alpha_0+\alpha(t), \quad (6)$$

and similarly for the instantaneous or average phase $$\Phi(t)=\phi_0+\phi(t). \quad (7)$$

In particular, in one embodiment of the invention, the phase is represents a linear chirp or sweep signal defined by $$\Phi(t) = \phi_0 + \omega_0 t + \frac{\omega_1 t^2}{2}, \quad (8)$$

where $$\omega_1=(\omega_T-\omega_0)/T, \quad (9)$$

and $0 \leq t \leq T$. This is a sweep starting at $\omega_0$ at t=0, and ending at $\omega_T$ at t=T. From equations (4) and (8), the instantaneous frequency is a linear function and is given by $$\Theta(t)=\omega_0+\omega_1 t. \quad (10)$$

Also this analysis will be limited to the case where $\Theta(t)$ varies slowly with each sample, i.e. $\Theta'(t)\Delta t \ll 1$ where $\Delta t$ is the sample interval. From equation (10), the time derivative of $\Theta(t)$ is easily seen to be $\Theta'(t)=\omega_1$. For a typical seismic sweep signal sampled at 500 samples/sec., starting at 10 Hz, and ending at 90 Hz and lasting 8 sec., we have $\omega_1 \Delta t = 2\pi (90-10)/(8\cdot 500)=\pi/25$ radians/sample.

From equations (5) and (8), we can now define an ideal amplitude modulated linear sweep as $$P(t)=A(t)\cos[\Phi(t)], \quad (11)$$

and with any added distortion modeled by the kth untapered sweep harmonic $$P_k(t)=\cos[k\Phi(t)], \quad (12)$$

where A(t) is the modulating instantaneous amplitude function, or the so-called taper function. This taper function is usually of the form $$A(t)=\alpha a_0\{1+\cos[\pi(1-t/\tau)]\}/2, \; 0 \leq t \leq \tau, \quad (13)$$

$$A(t)=\alpha_0 \tau < t < T-\tau, \text{ and} \quad (14)$$

$$A(t)=\alpha_0\{1-\cos[\pi(1-t/\tau)]\}/2, \; T-\tau \leq t \leq T, \quad (15)$$

where $\tau$ is the width of the startup and termination taper region. Such a taper is called a cosine taper. Other tapers that may be used include a linear taper and a Blackman taper: such tapers would be known to those versed in the art and are not described further. Furthermore, it is not necessary for the practice of the present invention that the taper at the beginning of the pilot signal be the same as the taper at the end of the pilot signal.

In a preferred embodiment of the invention, a distorted vibrator sweep signal S(t) is analyzed using the untapered input or pilot sweep signal P(t) as a reference. The distorted sweep S(t) may be approximated by $S_n(t)$ consisting of a sum of n individually amplitude modulated harmonics of the untapered pilot sweep, and for the kth harmonic each having a small phase error function $\delta_k(t)$ added to the original instantaneous phase $\Phi_k(t)$. This would be expressed as $$S_n(t) = \sum_{k=1}^{n} \alpha_k(t)\cos[\Phi_k(t) + \delta_k(t)], \quad (16)$$

where $S_n(t) \approx S(t)$, $\Phi_k(t)=k\Phi(t)$. This may also be represented using the quadrature form $$S_n(t) = \sum_{k=1}^{n} \{\beta_k(t)\cos[\Phi_k(t)] - \gamma_k(t)\sin[\Phi_k(t)]\}, \quad (17)$$

where $\alpha_k(t)=[\beta_k^2(t)+\gamma_k^2(t)]^{1/2}$, and $\delta_k(t)=\tan^{-1}[\gamma_k(t)/\beta_k(t)]$.

For the kth harmonic it remains to compute: $\alpha_k(t)$ its instantaneous amplitude, and $\delta_k(t)$ its instantaneous differential phase. For the trivial case of analyzing the undistorted pilot signal P(t), we would only have values for the fundamental, i.e. n=1. In this case, P(t) would easily be analyzed in terms of its instantaneous amplitude A(t) and phase $\Phi(t)$. Therefore, we would have from equation (16), $\alpha_1(t)=A(t)$ and $\delta_1(t)=0$ since $P(t)=A(t)\cos\Phi(t)$. However, in order to analyze a distorted sweep S(t) with many harmonics, direct instantaneous amplitude and phase analysis will not work because the interfering broad-banding effect of the harmonics themselves.

This invention isolates each harmonic or other selected signal component to produce an instantaneous amplitude and differential phase for that harmonic or other signal component. A quadrature heterodyne filter is used to shift each harmonic or other signal component down such that the original instantaneous kth harmonic or signal component phase $\Phi_k(t)=0$. This is achieved for the higher order harmonics by modulating the distorted sweep S(t) by a complex sinusoid as defined by $$H_k(t)=S(t)\{\cos[\Phi_k(t)]+j\sin[\Phi_k(t)]\}. \tag{18}$$

The effect of this modulation may be seen by substituting $S_n(t)$ from equation (16) into equation (18) for S(t) giving $$H_k(t) = \sum_{i=1}^{n} \alpha_i(t)\cos[\Phi_i(t) + \delta_i(t)]\{\cos[\Phi_k(t)] + j\sin[\Phi_k(t)]\}. \tag{19}$$

This may be expanded to give $$H_k(t) = \sum_{i=1}^{n} \alpha_i(t)\{\{\cos[\Phi_i(t) + \delta_i(t) - \Phi_k(t)] + \cos[\Phi_i(t) + \delta_i(t) + \Phi_k(t)]\}/2 + j\{\sin[\Phi_i(t) + \delta_i(t) + \Phi_k(t)] - \sin[\Phi_i(t) + \delta_i(t) - \Phi_k(t)]\}/2\}. \tag{20}$$

Now looking only at the case where i=k gives $$H_{i=k}(t) = \alpha_k(t)\{\{\cos[\delta_k(t)] + \cos[2\Phi_k(t) + \delta_k(t)]\}/2 + j\{\sin[2\Phi_k(t) + \delta_k(t)] - \sin[\delta_k(t)]\}/2\}. \tag{21}$$

Because $\delta_k(t)$ is small relative to $\Phi_k(t)$, we band limit the complex signal $H_k(t)$ using a low-pass filter. This keeps the Fourier terms near zero frequency (d.c.) and rejects the larger terms in $[2\Phi_k(t)]$. This low-pass filtered version of $H_k(t)$ may be defined as $$\tilde{H}_k(t)=\tilde{R}_k(t)+j\tilde{I}_k(t)=\alpha_k(t)\{\cos[\delta_k(t)]-j\sin[\delta_k(t)]\}/2, \tag{22}$$

where the real and imaginary components are explicitly shown. We are also assuming that because the instantaneous amplitude is slowly varying, that $\alpha_k(t)\approx\alpha_k(t)$.

We now derive the desired functions $\alpha_k(t)$ and $\delta_k(t)$. As for the instantaneous amplitude and differential phase from equation (22)

$$\alpha_k(t)\approx 2|\tilde{H}_k(t)|=2[\tilde{R}_k^2(t)+\tilde{I}_k^2(t)]^{1/2}, \text{ and}$$

$$\delta_k(t)\approx\tan^{-1}[\tilde{I}_k(t)/\tilde{R}_k(t)]. \tag{23}$$

In terms of our quadrature representation in equation (17) we have $$\beta_k(t)\approx 2\tilde{R}_k(t), \text{ and}$$

$$\gamma_k(t)\approx 2\tilde{I}_k(t). \tag{24}$$

These approximations are only valid if these distortion functions are slowly varying and if $\omega_0$, the starting sweep frequency, is not too small. This latter restriction is necessary to avoid harmonic interference early in an ascending sweep signal.

In a preferred embodiment of the invention, the low pass filter cut-off is between 1% and 10% of the Nyquist frequency. The low pass filtering is done using FFTs in the frequency domain. A transition zone width of about 25% of the low-pass cut-off value is effective in reducing the ringing effects of the filtering. Harmonic interference is reduced by starting the analysis at k=1 and moving up to k=n. Each harmonic may be synthesized from either $$S_k(t)=\alpha_k(t)\cos[\Phi_k(t)+\delta_k(t)], \text{ or}$$

$$S_k(t)=\beta_k(t)\cos[\Phi_k(t)]+\gamma_k(t)\sin[\Phi_k(t)], \tag{25}$$

and the result subtracted from the remaining distorted sweep signal. Other basis functions besides integer-multiple harmonics may be isolated and subtracted with this method as well, for example rational fractional sub-harmonics, ultra-subharmonics or other dynamic oscillations of the pilot reference source signal.

Care is taken to insure that any time delays between the input pilot sweep P(t) and the distorted output sweep S(t) are removed or otherwise compensated. This may be done by using a cross correlation between the sweep and the pilot, and then scanning for the peak value. The location of the peak should be at zero lag, or else the signals should be appropriately shifted to ensure this condition. The accuracy of the distortion analysis, can be measured by computing the synthesis residual for the sum of the $1^{st}$ n harmonics using equation (16) and is defined by $$E_n(t)=S(t)-S_n(t), \tag{26}$$

and then evaluating the relative vector norm $$e_n=\|E_n(t)\|/\|S(t)\|. \tag{27}$$

Thus $e_n$ is a measure of the error in synthesizing the distorted sweep using the first n harmonics or other signal components from the analysis.

Data are acquired by means of generating a suitable seismic signal by a source as shown in FIG. 1a. A suitable source may be a seismic vibrator that generates seismic acoustic waves that travel through the earth. The vibrations are recorded at a suitable receiver or receivers, such as a geophone or geophones, buried in the ground or on the surface, and may then be analyzed for signal components of interest.

The source example of FIG. 1a is 30 a truck mounted vibrator for land surveys, but other combinations are well known in the art, for instance a marine vibrator for data acquisition in areas covered by water. The acoustic vibrations of the outgoing signal from the source may be recorded for analysis on the source itself as is common in the practice of the art, or very near the source with a buried geophone 32 in some land acquisition programs, with a near source hydrophone in marine surveys, or any other suitable near-field sensor or combinations of sensors.

Acoustic vibrations travel from the source 30 along seismic ray paths 34 through the earth to a receiver or receivers, for example a geophone, 36. Data recorded by any suitable receiver, on the source itself, in the immediate area of the source or after passing any distance through the earth may be analyzed with this invention.

Figure 2:
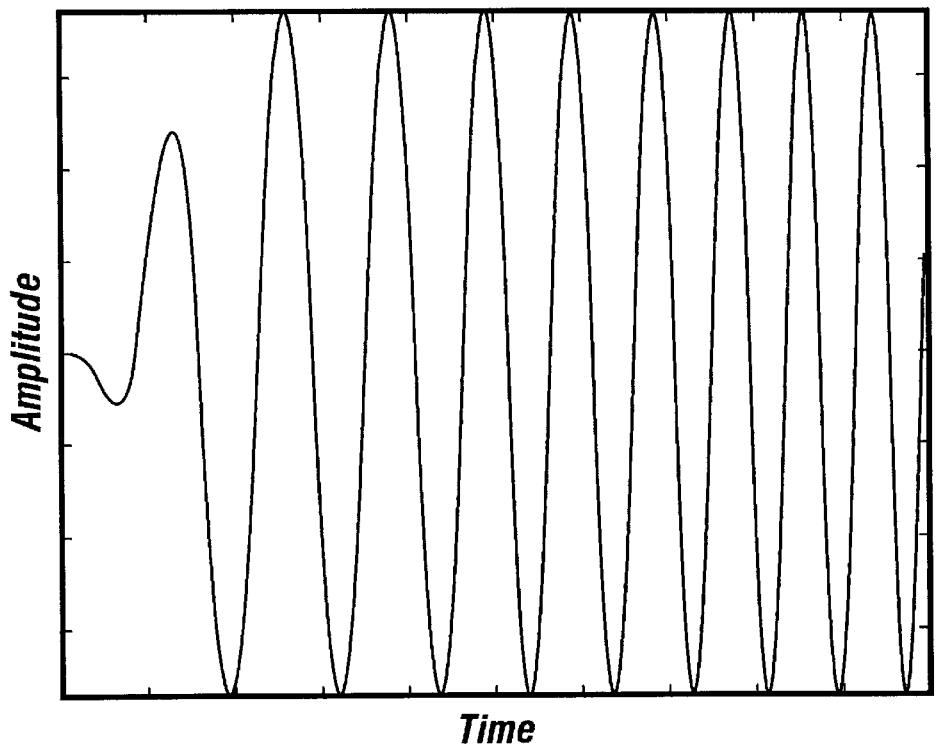
FIG. 2 illustrates a typical tapered swept-frequency or chirp source waveform without distortion, associated with the pilot sweep.
Figure 3:
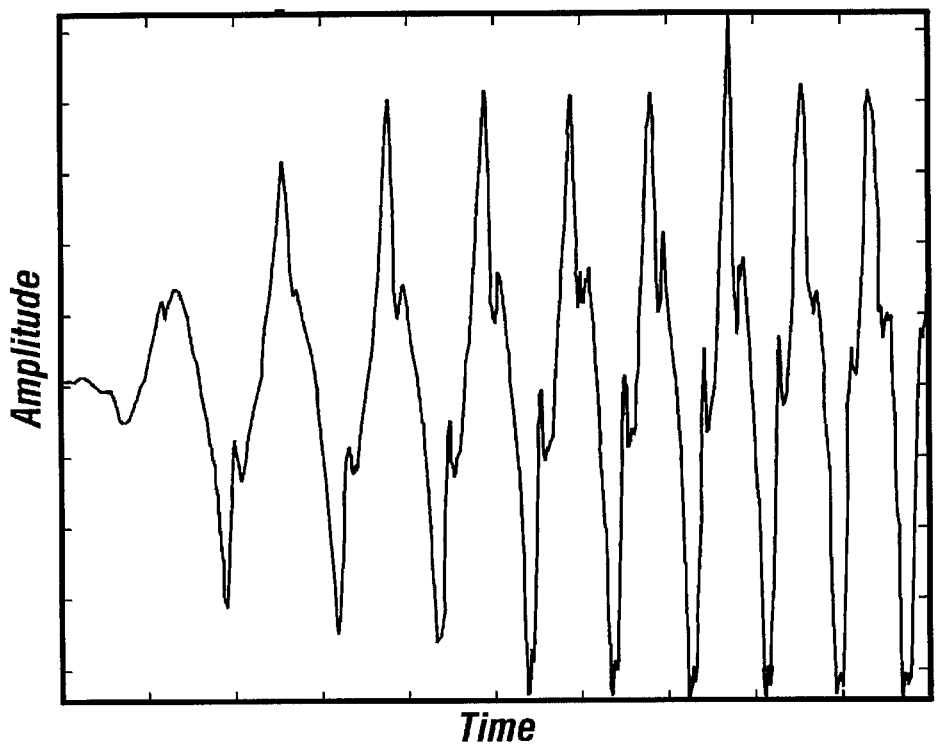
FIG. 3 illustrates a typical swept-frequency or chirp waveform with distortion, associated with actual energy imparted to the earth.

A flow chart demonstrating a preferred embodiment of the invention is displayed in FIG. 1b. For this invention, one embodiment is for a seismic vibrator to generate an arbitrary acoustic signal over a predetermined time duration and frequency range. This generated acoustic signal is then called the pilot sweep and contains predetermined sweep characteristics chosen by the practitioner. An example of a pilot sweep is shown in FIG. 2. In practice, the acoustic energy generated by a seismic vibrator contains many other signal components besides the predetermined pilot sweep characteristics. An example of a real or distorted sweep measured by a suitable receiver as shown in FIG. 1a containing these other signal characteristics is shown in FIG. 3. It is to the analysis and synthesis of these signal components to which this invention is directed.

The first step is to determine the instantaneous phase $\Phi(t)$ of the input pilot sweep signal P(t) as shown at 62 of FIG 1b and, in the usual case, set k=1. The complex modulation function of the signal component to be synthesized will be derived from the pilot sweep, P(t). A typical pilot sweep is shown in FIG. 2. For the demonstration purposes of the figure and not by way of limitation, only a limited frequency range is shown. Real data pilot sweeps are generally between 5 and 200 Hertz, and may go higher. In the usual case, the fundamental (or $1^{st}$ harmonic) will be the first signal component to be synthesized, though any signal component may be synthesized first.

Figure 4:
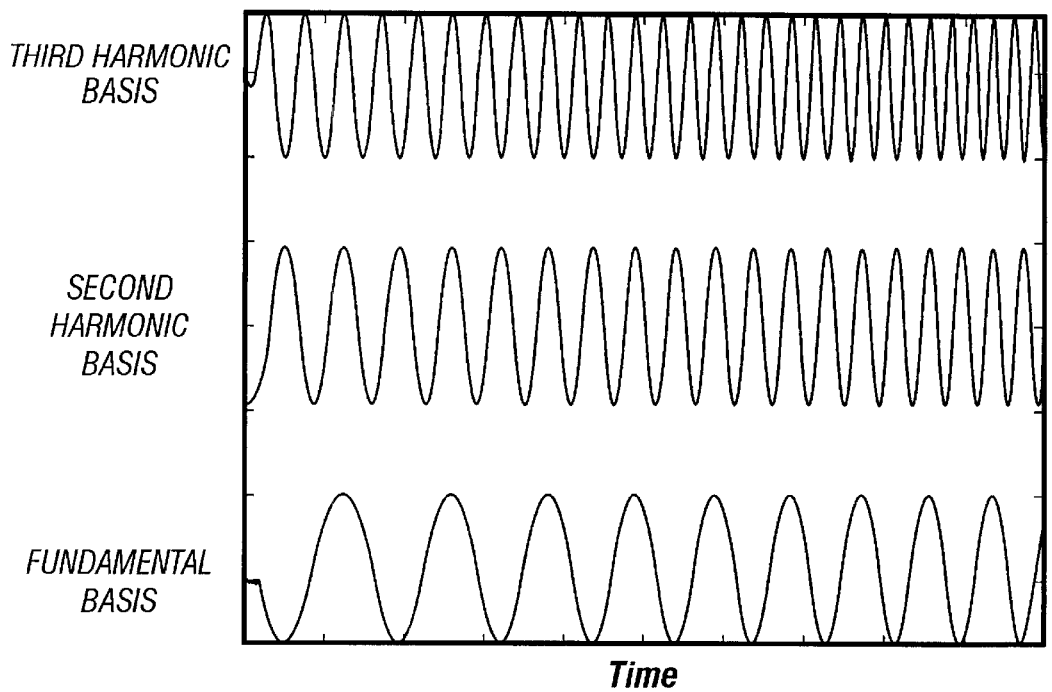
FIG. 4 illustrates real components of typical bases of the pilot sweep of FIG. 2.

The next step is to form the complex modulation function for the heterodyning filter for the signal component to be analyzed, as shown in 64 of FIG 1b, for instance in the kth harmonic case: $\{\cos[\Phi_k(t)]+j\sin[\Phi_k(t)]\}$. Typical bases examples of a pilot sweep are shown in FIG. 4. In FIG. 4, only the real component of the bases are shown, and again for figure demonstration purposes, only limited frequency ranges are shown. It will be understood by those practiced in the art that real sweep frequency ranges and their bases may cover several octaves.

The data in the distorted real data output from the vibrator, the outgoing or near field signal of the acoustic wavefield 52, may be acquired from any of the usual signals measured in, on or around the vibrator, or acquired by any appropriate sensor, receiver or geophone. Typical vibrator output signals are baseplate and reaction mass accelerations or forces, other near-field sensors, or any combination. Near-field signals may be measured using accelerometers, geophones, or other sensors and combinations as appropriate.

The targeted data are then filtered as shown in 66, for example the distorted sweep of 52 for the first case when 54 applies, by the derived complex modulation function of 64. In the usual case, the first synthesis would entail multiplying the untapered basis function of the fundamental pilot sweep by the distorted sweep data. The first time series in FIG. 4 (with its imaginary part, not shown in FIG. 4) would be multiplied by the time series in FIG. 3.

Figure 5:
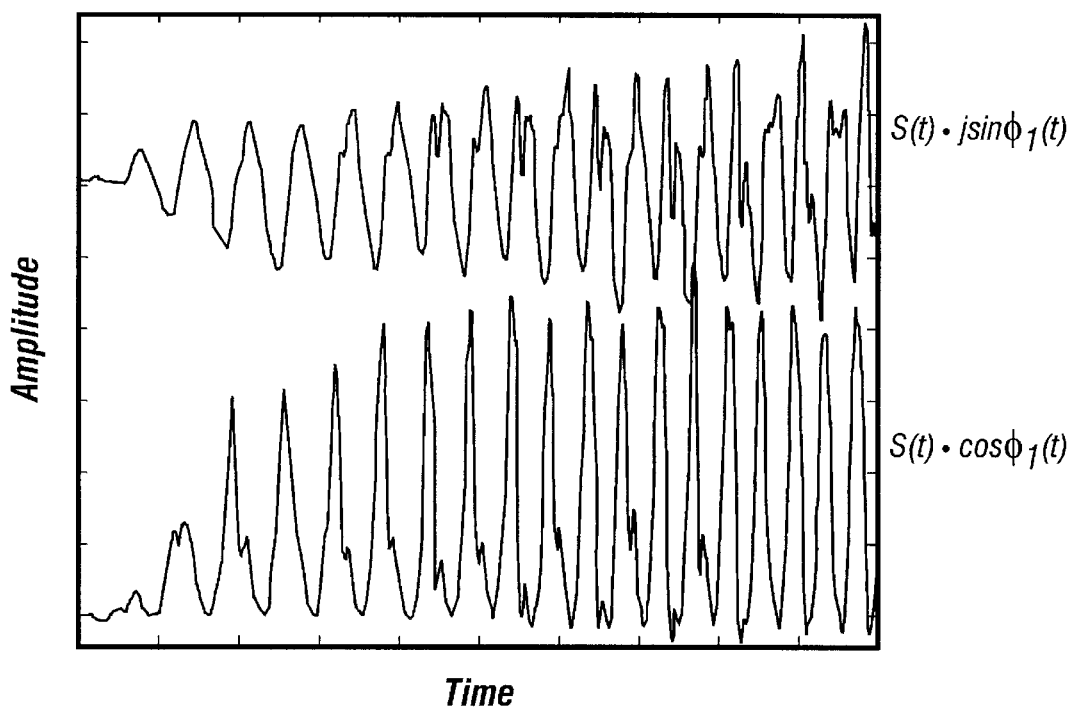
FIG. 5 illustrates the output of the modulation of the distorted sweep in FIG. 3 with the derived complex modulation function for the $1^{st}$ harmonic from FIG. 4.
Figure 6:
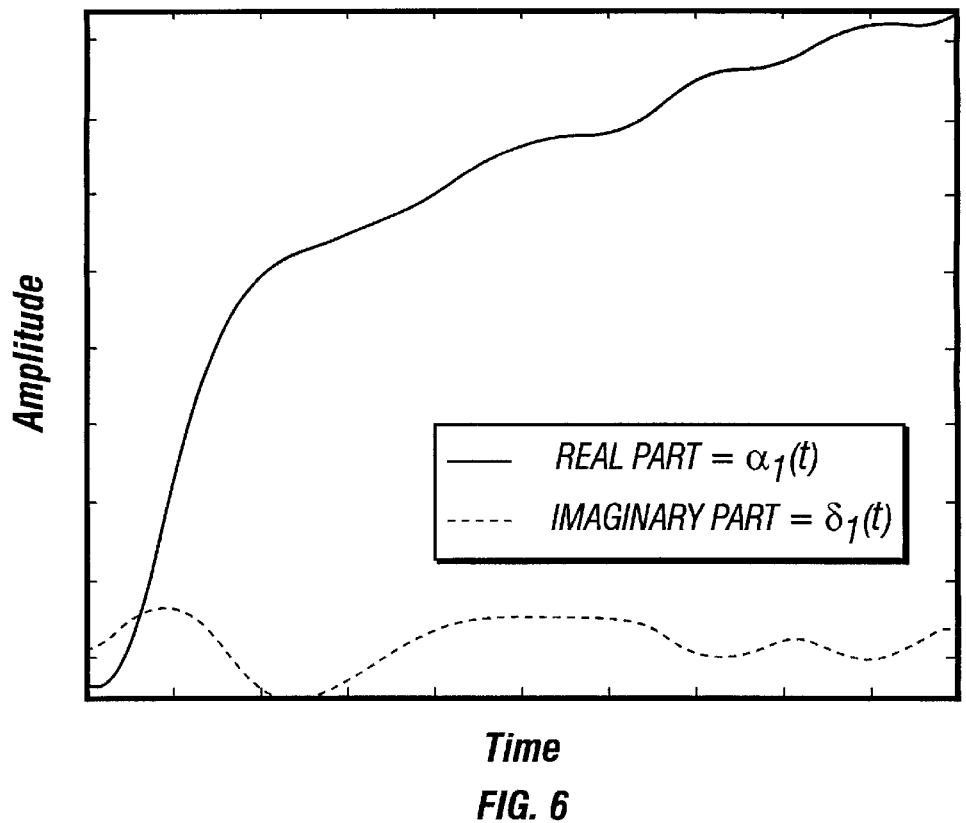
FIG. 6 illustrates the time series in FIG. 5 after low pass filtering.

The resulting complex time series contains the instantaneous amplitude $\alpha_k(t)$ and the differential instantaneous phase $\delta_k(t)$ of interest. An example of the output from this operation is shown in FIG. 5. The amplitude and phase components of the harmonic or signal component being synthesized are computed from this time series after applying a suitable low-pass filter as shown in 68. A time series representation of the low-pass filter output is shown in FIG. 6.

Figure 7:
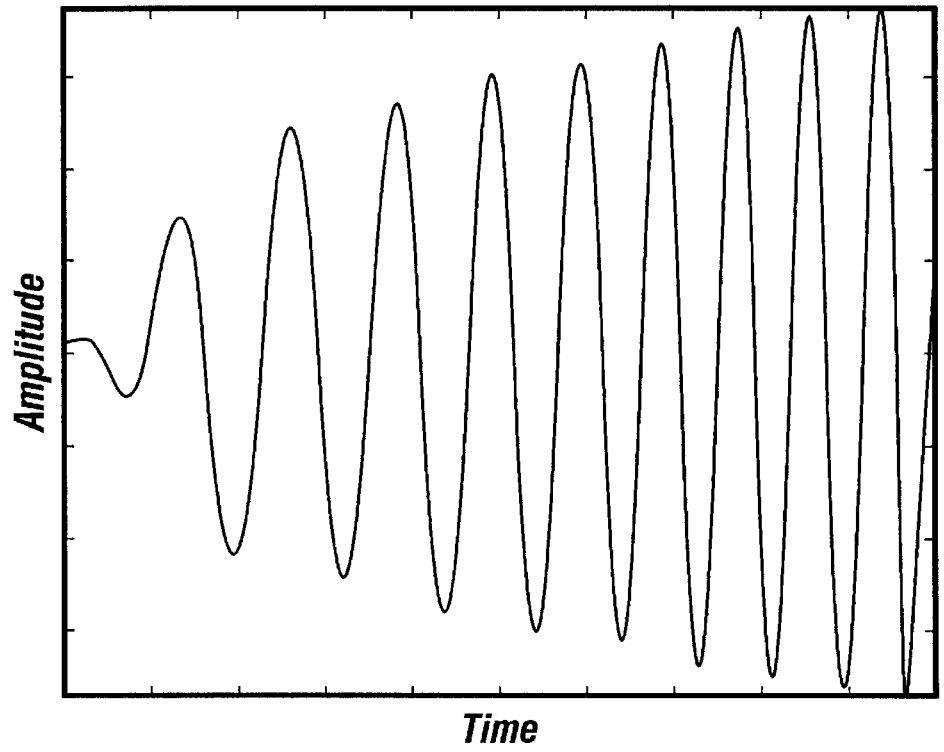
FIG. 7 illustrates the synthesized $1^{st}$ harmonic component of the target seismic signal of FIG. 3 that has been computed using the output in FIG. 6.

When the phase and amplitude components have been determined as in 70, the targeted harmonic or other signal component data are then synthesized as in 72. This synthesis, in the kth harmonic case, may be derived as in equatio (25) above. FIG. 7 is the synthesized component of the fundamental (or $1^{st}$ harmonic) that has been extracted from the original distorted sweep.

After synthesis, these data are subtracted from the distorted sweep at 74. In the usual first case, the synthesized component of the pilot sweep associated with the fundamental is subtracted from the distorted sweep.

After the first synthesis and subtraction, the next signal component to be analyzed is chosen, 76 with 78. In the usual case, the second harmonic of the pilot sweep will be synthesized with this method. Subsequent signal components, which may be higher order harmonics, sub-harmonics or other dynamic oscillatory behavior may be synthesized.

After each component of the original distorted signal has been subtracted from the remaining time series, the result may be analyzed by the method outlined above in equations (26) and (27) until an arbitrarily small or acceptable level has been achieved.

The invention has been described above using an example wherein the frequency of the signal is a linear function of time. The method of the present invention may also be used wherein the frequency is a continuous function of time and such a variation is intended to be within the scope of the invention.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of seismic prospecting using a vibratory source, the method comprising:
   (a) activating the vibratory source using a reference pilot signal, said reference pilot signal having an initial frequency at a starting time and an ending frequency at an ending time;
   (b) determining an instantaneous phase of the reference pilot signal;
   (c) measuring the outgoing or near-field signal from said vibratory source;
   (d) defining a plurality of basis signals based on sinusoids of multiples of the instantaneous phase of the reference pilot signal, each of said basis signals being a sinusoid having a linear instantaneous frequency and instantaneous differential phase wherein said linear instantaneous frequency is a multiple of an instantaneous frequency of the reference pilot signal; and
   (e) representing said measured outgoing or near-field signal as a sum of the basis signals weighted by associated instantaneous amplitudes, each associated with a harmonic of the outgoing or near field signal.

2. The method of claim 1 where the associated instantaneous amplitudes for each said harmonic is obtained by a process that further comprises defining a quadrature heterodyne filter for at least one of the plurality of basis signals.

3. The method of claim 2 further comprising:
   i) applying at least one said quadrature heterodyne filter to the measured outgoing or near-field signal to give a modulated outgoing signal;
   ii) low pass filtering the modulated outgoing signal; and
   iii) determining the instantaneous amplitude and the instantaneous differential phase for the at least one of the plurality of basis functions from the low pass filtered modulated outgoing or near-field signal.

4. The method of claim 3 wherein the at least one of the plurality of basis signals further comprises an ordered plurality of harmonics of the reference pilot signal, the method further comprising iteratively subtracting from the measured outgoing or near field signal the weighted basis function including the corresponding instantaneous differential phase.

5. The method of claim 1 wherein said multiple of the phase of the basis function is selected from (i) an integer multiple, and, (ii) a fractional multiple.

6. The method of claim 1 further comprising using a taper of the instantaneous amplitude of the reference pilot signal.

7. The method of claim 6 wherein said taper is selected from the group consisting of (i) a cosine taper, (ii) a Blackman taper, and, (iii) a linear taper.

8. The method of claim 6 wherein the taper at the beginning of the reference pilot signal is different from the taper at the end of the reference pilot signal.

9. A method of seismic prospecting using a vibratory source, the method comprising:
  (a) activating a vibratory source using a reference pilot signal, said reference pilot signal having an initial frequency at a starting time and an ending frequency at an ending time, and a rate of change of frequency;
  (b) determining an instantaneous phase of the reference pilot signal;
  (c) measuring an outgoing or near-field signal from said vibratory source;
  (d) defining a plurality of basis signals based on sinusoids of multiples of the instantaneous phase of the reference pilot signal, each of said basis signals being a sinusoid having a frequency continuously changing with time and an instantaneous differential phase wherein said frequency is a multiple of an instantaneous frequency of the reference pilot signal; and
  (e) representing said measured outgoing or near-field signal as a sum of the basis signals weighted by associated instantaneous amplitudes, each associated with a harmonic of the outgoing or near-field signal.

10. The method of claim 9 wherein the instantaneous amplitudes for each said harmonic is obtained by a process that further comprises defining a quadrature heterodyne filter for at least one of the plurality of basis signals.

11. The method of claim 10 further comprising:
  i) applying at least one said quadrature heterodyne filter to the measured outgoing or near-field signal to give a modulated outgoing signals;
  ii) low pass filtering the modulated outgoing signal; and
  iii) determining the instantaneous amplitude and the instantaneous differential phase for the at least one plurality of basis functions from the low pass filtered modulated outgoing signal.

12. The method of claim 11 wherein the at least one of the plurality of basis signals further comprises an ordered plurality of harmonics of the reference pilot signal, the method further comprising iteratively subtracting from the measured outgoing signal, the basis function including the corresponding instantaneous differential phase.

13. The method of claim 9 wherein said multiple is selected from the group consisting of (i) an integer multiple, and, (ii) a fractional multiple.

14. The method of claim 9 further comprising using a taper of the instantaneous amplitude of the reference pilot signal.

15. The method of claim 14 wherein said taper is selected from the group consisting of (i) a cosine taper, (ii) a Blackman taper, and, (iii) a linear taper.

16. The method of claim 14 wherein the taper at the beginning of the reference pilot signal is different from the taper at the end of the reference pilot signal.

17. A method of seismic signal analysis using a vibratory source, the method comprising:
  (a) acquiring a seismic signal produced by a vibratory source using a reference pilot signal, said reference pilot signal having an initial frequency at a starting time, an ending frequency at an ending time and a rate of change of frequency;
  (b) determining an instantaneous phase of the reference pilot signal;
  (c) defining a plurality of basis signals based on sinusoids of multiples of the instantaneous phase of the reference pilot signal, each of said basis signals being a sinusoid having a frequency continuously changing with time and an instantaneous differential phase wherein said frequency is a multiple of an instantaneous frequency of the reference pilot signal; and
  (d) decomposing said seismic signal produced by a vibratory source into the basis signals weighted by associated instantaneous amplitudes, each basis signal associated with a harmonic of said seismic signal.

18. The method of claim 17 wherein the associated instantaneous amplitudes associated with a harmonic of said seismic signal is obtained by a process that further comprises defining a quadrature heterodyne filter for at least one of the plurality of basis signals.

19. The method of claim 18 further comprising:
  i) applying said quadrature heterodyne filter to the acquired seismic signal to give a modulated signal;
  ii) low pass filtering the modulated signal; and
  iii) determining the instantaneous amplitude and the instantaneous differential phase for the at least one of the plurality of basis functions from the low pass filtered modulated signal.

20. The method of claim 17 wherein the at least one of the plurality of basis signals further comprises an ordered plurality of harmonics of the reference pilot signal, the method further comprising iteratively subtracting from the acquired signal the basis function including the corresponding differential phase.

21. The method of claim 17 wherein said multiple of the phase of the basis function is selected from (i) an integer multiple, and, (ii) a fractional multiple.

22. The method of claim 17 further comprising using a taper of the instantaneous amplitude of the reference pilot signal.

23. The method of claim 22 wherein said taper is selected from the group consisting of (i) a cosine taper, (ii) a Blackman taper, and, (iii) a linear taper.

* * * * *